(12) United States Patent
Su et al.

(10) Patent No.: US 10,678,949 B2
(45) Date of Patent: Jun. 9, 2020

(54) SENSITIVE ELEMENT PROTECTION MECHANISM AND PAYMENT DEVICE

(71) Applicant: PAX COMPUTER TECHNOLOGY (SHENZHEN) CO., LTD., Shenzhen, Guangdong (CN)

(72) Inventors: Xiaoyan Su, Guangdong (CN); Yuzhuo Wang, Guangdong (CN); Liheng Deng, Guangdong (CN)

(73) Assignee: PAX COMPUTER TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 180 days.

(21) Appl. No.: 15/745,056

(22) PCT Filed: Jul. 31, 2017

(86) PCT No.: PCT/CN2017/095270
§ 371 (c)(1),
(2) Date: Jan. 15, 2018

(87) PCT Pub. No.: WO2018/153022
PCT Pub. Date: Aug. 30, 2018

(65) Prior Publication Data
US 2019/0012482 A1    Jan. 10, 2019

(30) Foreign Application Priority Data
Feb. 22, 2017 (CN) ............ 2017 2 0164742 U (51) Int. Cl.
*G06F 21/00* (2013.01)
*G06F 21/71* (2013.01)
(Continued)

(52) U.S. Cl.
CPC .............. *G06F 21/71* (2013.01); *G06F 21/86* (2013.01); *G07F 7/0873* (2013.01);
(Continued)

(58) Field of Classification Search
CPC .. G06F 21/71; G06F 21/86; G06F 2221/2143; G07F 7/0873; G07G 1/0018; G07G 1/12
See application file for complete search history.

(56) References Cited

U.S. PATENT DOCUMENTS 4,953,002 A * 8/1990 Nelson .................. H01L 23/552
174/353
10,115,741 B2 * 10/2018 Matsuda ............... G11C 11/418
(Continued)

FOREIGN PATENT DOCUMENTS

| CN | 201674508 | 12/2010 |
|---|---|---|
| CN | 203287908 | 11/2013 |
| CN | 204331762 | 5/2015 |

OTHER PUBLICATIONS

Written Opinion and International Search Report for PCT/CN2017/095270 dated Nov. 28, 2017, 11 pages.

*Primary Examiner* — Alexander Lagor
*Assistant Examiner* — Rodman Alexander Mahmoudi
(74) *Attorney, Agent, or Firm* — Rankin, Hill & Clark LLP (57) ABSTRACT

A sensitive element protection mechanism and a payment device using the sensitive element protection mechanism includes a circuit board; a sensitive element configured for storing, transmitting and/or processing user account information and user transaction information; a shield arranged in parallel with the circuit board; and an elastic member connecting the circuit board and the shield. The sensitive element is located on a side of the circuit board near the shield. The circuit board and the shield are provided and the sensitive element is provided between the circuit board and the shield so as to protect the sensitive element through the shield. The elastic member connects the circuit board and the shield to prevent the circuit board from being separated from the shield, thus preventing the circuit board from being
(Continued)

opened to steal sensitive information in the sensitive element.

9 Claims, 7 Drawing Sheets

(51) Int. Cl.
*G07G 1/12* (2006.01)
*G06F 21/86* (2013.01)
*G07F 7/08* (2006.01)
*G07G 1/00* (2006.01)

(52) U.S. Cl.
CPC ............ *G07G 1/0018* (2013.01); *G07G 1/12* (2013.01); *G06F 2221/2143* (2013.01)

(56) References Cited

U.S. PATENT DOCUMENTS

| | | | |
|---|---|---|---|
| 2006/0162287 A1* | 7/2006 | Hasegawa | H01R 11/01 53/362 |
| 2009/0047830 A1* | 2/2009 | Lin | G06K 7/0021 439/607.01 |
| 2019/0114623 A1* | 4/2019 | Wurmfeld | G06K 19/0723 |

* cited by examiner

SENSITIVE ELEMENT PROTECTION MECHANISM AND PAYMENT DEVICE

TECHNICAL FIELD

The present application pertains to the field of payment devices, and in particular relates to a sensitive element protection mechanism and a payment device using the sensitive element protection mechanism.

BACKGROUND

As the technology develops, it is more and more convenient for transaction payment and there are also more payment methods, such as near field payment and code scanning payment. When making transaction payments, it is especially important for payment devices to protect the information of users because of the direct involvement of user account information. Most of the current payment devices encrypt and transmit data through sensitive elements such as internal security chips to keep user transaction data and user account security. The protection of these sensitive elements directly involves the protection of user accounts and transaction information to prevent user information from being stolen.

SUMMARY

The purpose of the present application is to provide a sensitive element protection mechanism, which aims at protecting the sensitive element in the payment device, protecting user accounts and transaction information to prevent user information from being stolen.

The present application is realized as follows. A sensitive element protection mechanism comprises a circuit board and a sensitive element configured for storing, transmitting and/or processing user account information and user transaction information, wherein, the sensitive element protection mechanism further comprises a shield arranged in parallel with the circuit board and an elastic member connecting the circuit board and the shield to prevent the circuit board from being separated from the shield, and the sensitive element is located on a side of the circuit board nearer to the shield.

Further, the circuit board or the shield is provided with a groove configured to position the elastic member.

Further, the elastic member is provided at the periphery of the circuit board, or at both sides of the circuit board, or in the middle of the circuit board.

Further, the distance between the circuit board and the shield is in a range from 2.5 mm to 3.5 mm.

Further, a protection device configured to shield the sensitive element is provided at the circuit board and around the sensitive element, and the height of each protection device is greater than the thickness of the sensing element.

Further, a PCB wall configured to shield the sensitive element is further provided at the circuit board.

Further, a zebra strip connecting the circuit board with the shield is provided in the PCB wall.

Further, a display screen is further mounted at the shield, an FPC is provided at the display screen, and the FPC is connected to the circuit board.

Further, the length of the FPC is equal to the length of the connection from the display screen to the circuit board, and the ratio of the width of the FPC to the length of the side of the display screen where the FPC is located is in a range from ½ to 1.

According to the present application, the circuit board and the shield are provided and the sensitive element is provided between the circuit board and the shield so as to protect the sensitive element through the shield. Meanwhile, the elastic member is provided to connect the circuit board and the shield so as to prevent the circuit board from being separated from the shield, thus preventing the circuit board from being opened to steal sensitive information in the sensitive element, and thus protecting user accounts and transaction information and preventing user information from being stolen.

Another object of the present application is to provide a payment device, comprising a top shell and a bottom shell, wherein the payment device further comprises the sensitive element protection mechanism as described above, and the shield of the sensitive element protection mechanism is the top shell.

The payment device of the present application uses the above-mentioned sensitive element protection mechanism while using the shield of the payment device as the shield of the above-mentioned sensitive element protection mechanism, which can prevent the sensitive information in the sensitive element from being stolen to protect the user account and the transaction information and prevent user information from being stolen.

DESCRIPTION OF THE EMBODIMENTS

In order to make the objectives, technical solutions and advantages of the present application clearer, the present application will be further described in detail with reference to the accompanying drawings and embodiments. It should be understood that the specific embodiments described herein are only used to explain the present application, and are not intended to limit the present application.

It should be noted that when an element is referred to as being "fixed on" or "provided at" another element, the element may be directly located on the other element or there may be an intermediate element at the same time. When an element is referred to as being "connected to" another element, the element may be directly connected to the other element or there may be an intermediate element at the same time.

It should also be noted that in the description of the present application, it should be noted that the orientation or positional relationship of the terms such as "middle", "upper", "lower", "horizontal", "bottom", "inner" and "outer" is based on the orientation or positional relationship shown in the accompanying drawings merely for the convenience of describing the present application and a simplified description rather than indicating or implying that the indicated device or element must have a particular orientation, be constructed and operate in a particular orientation. Therefore it cannot be understood as a limitation of the present application.

In the present application, Chinese translation corresponding to each English word is as follows: FPC (Flexible Printed Circuit, referred to as FPC for short). PCB (Printed Circuit Board) has a Chinese name of a printed circuit board and is also referred to as a printed wiring board.

Referring to FIGS. 1-8, a payment device 100 according to an embodiment of the present application comprises a top shell 11 and a bottom shell 12. The top shell 11 and the bottom shell 12 are snap-connected. The top shell 11 is fixed on the bottom shell 12 so that the top shell 11 and the bottom shell 12 form a receiving space configured for mounting various electronic components. The payment device 100 further comprises a sensitive element protection mechanism 10. The sensitive element protection mechanism 10 is provided to protect user accounts and transaction information and to prevent user information from being stolen.

The sensitive element protection mechanism 10 comprises a circuit board 21, a shield, an elastic member 36 and a sensing element 27. The elastic member 36 is configured for connecting the circuit board 21 to the shield to prevent the circuit board 21 from being separated from the shield; the sensitive element 27 is configured for storing, transmitting and/or processing user account information and user transaction information for facilitating secure payment transactions. The sensing element 27 is located at a side of the circuit board 21 nearer to the shield.

The circuit board 21 and the shield are provided and the sensitive element 27 is provided between the circuit board and the shield so as to protect the sensitive element 27 through the shield. Meanwhile, the elastic member 36 is provided to connect the circuit board 21 and the shield so as to prevent the circuit board 21 from being separated from the shield, thus preventing the circuit board 21 from being opened to steal sensitive information in the sensitive element 27, and thus protecting user accounts and transaction information and preventing user information from being stolen.

In this embodiment, the shield is the top shell 11 of the payment device 100 to reduce the volume of the payment device 100. In other embodiments, the shield may also be provided separately, or the shield may be another printed wiring board and the like.

The payment device 100 uses the above-mentioned sensitive element protection mechanism 10 while the top shell 11 of the payment device 100 serves as the shield of the above-mentioned sensitive element protection mechanism 10, thus preventing the sensitive information in the sensitive element 27 from being stolen, and thus protecting user accounts and transaction information and preventing user information from being stolen.

Referring to FIGS. 5, 6, 7 and 8, further, the elastic member 36 may be a zebra strip or a silicone strip. The circuit board 21 is connected with the shield through the zebra strip or the silicone strip so as to prevent the circuit board 21 from being separated from the shield better, namely, preventing the circuit board 21 from being opened.

Further, the circuit board 21 or the shield is provided with a groove (not shown in the figure) configured for positioning the elastic member 36. The circuit board 21 or the shield is provided with a groove to facilitate the mounting and positioning of the elastic member 36 while reducing the distance between the circuit board 21 and the shield.

Further, in this embodiment, an elastic member 36 is provided in the middle of the circuit board 21 for connecting the circuit board 21 with the shield. In other embodiments, the elastic member 36 may also be provided at the periphery of the circuit board 21 or at both sides of the circuit board 21, which not only can play the role of connecting the circuit board 21 with the shield but also play the role of shielding the protection sensitive element 27.

Further, the distance between the circuit board 21 and the shield is in a range from 2.5 to 3.5 mm. The distance between the circuit board 21 and the shield is set to be 2.5-3.5 mm so as to limit the angle of attack towards the sensitive element 27 and further protect the sensitive element 27 better.

Further, a protection device (not shown in the figures) configured for shielding the sensitive element 27 is provided at the circuit board 21 around the sensitive element 27, and the height of each protection device is greater than the thickness of the sensing element 27. The protection device is provided at the circuit board 21 and the height of the protection device is set to be greater than the thickness of the sensitive element 27 so that the sensitive element 27 can be shielded to better protect the sensitive element 27 and limit the possible angle and position of attack on the sensitive element 27. Specifically, the protection device may be an electronic device having a certain height such as a security CPU, a FLASH, a 0805 resistor-capacitor, etc.

Further, a PCB wall 35 configured for shielding the sensitive element 27 is further provided at the circuit board 21. The PCB wall 35 is provided at the circuit board 21. The PCB wall 35 shields and protects the sensing element 27 to better protect the sensing element 27, prevent the sensing element 27 from being attacked and prevent the sensitive information from being stolen. In particular, an L-shaped or U-shaped or strip-shaped PCB wall 35 may be provided to protect the sensing element 27. Further, one side of the PCB wall 35 facing the circuit board 21 is connected to a pad on the circuit board 21 so as to trigger a security mechanism such as clearing keys and locking devices when the PCB wall 35 is damaged. In other embodiments, the PCB wall 35 may also be in the form of a patch, i.e., attached to the circuit board 21. Further, a conductive mesh may be provided at the PCB wall 35 for further security protection. When the PCB wall 35 is attacked, the conductive mesh will be damaged first, thereby triggering a security mechanism.

Further, a zebra strip connecting the circuit board 21 with the shield is provided in the PCB wall 35. The zebra strip is provided to better connect the circuit board 21 with the shield and prevent the circuit board 21 from being disassembled from the shield for better security protection.

Further, a display screen 33 is further mounted at the shield, the display panel 33 is provided with an FPC 34, and the FPC 34 is connected to the circuit board 21. The display screen 33 is provided so as to display the content of payment and thereby further facilitate customers' use. Since the shield is a panel of the payment device 100 in this embodiment, the display screen 33 may be set as a touch screen, facilitating inputting operations through the display screen 33, and facilitating online payment at the same time. Specifically, online payment comprises: applications APPS, browsers, APP calls for various network payments (application calls for various payments), etc.

Further, the sensing element 27 may be directly mounted at the circuit board 21. In some other embodiments, the sensing element 27 may be mounted at the FPC 34 while the FPC 34 extends between the circuit board 21 and the shield.

Further, the display screen 33 may also display a two-dimensional code map, so that customers can use a smart device such as a mobile phone and a tablet to perform online code scanning payment.

Further, the length of the FPC 34 is equal to the length of the connection from the display screen 33 to the circuit board 21, and the ratio between the width of the FPC 34 and the length of the side where the FPC 34 on the display screen 33 is located is in a range from ½ to 1. The length of the EPC is set to be equal to the length of the connection from the display screen 33 to the circuit board 21, which may increase the difficulty of disassembling the FPC 34; and the ratio between the width of the FPC 34 and the length of the corresponding side of the display screen 33 is set to be in a range from ½ to 1. That is to say, the width of the FPC 34 is from half of the length of the corresponding side of the display screen 33 to the extent that the entire corresponding side of the display screen 33 is provided with the FPC 34. Compared with the prior art, this structure increases the width of the FPC 34 so as to be torn off when the FPC 34 is opened to protect the display screen 33 and prevent credit card fraud due to the change of the consumption information through the display screen 33. In this embodiment, the length of the FPC 34 is slightly smaller than the length of the display screen 33, and the FPC 34 is attached to the back of the display screen 33. The display screen 33 may be protected by the FPC 34 to improve the security.

Further, a first gold finger 341 is provided at the FPC 34, a second gold finger (not shown) is provided at the circuit board 21, and the sensitive element protection mechanism 10 further comprises a connecting member configured for being pressed against the first gold finger 341 and the second gold finger to electrically connect the first gold finger 341 and the second gold finger. The first gold finger 341 and the second gold finger are pressed by the connecting member to electrically connect the first gold finger 341 with the second gold finger. The FPC 34 is protected by the connecting member. When the connecting member is loosened, or the display screen 33 is opened, the connecting member will be loosened, and a trigger signal will be issued to play the role of security protection and prevent the FPC 34 from being opened or damaged. In this embodiment, the connecting member is a zebra strip. In other embodiments, the connecting member may also be a support or a cylindrical silicone, etc.

Further, a conductive mesh is provided at the FPC 34, and the conductive mesh is connected with the circuit board 21. The conductive mesh (mesh in English) is provided. When the FPC 34 is opened or damaged, the conductive mesh will be destroyed first to issue a trigger signal to trigger a security mechanism. Further, a conductive mesh is provided inside the FPC 34 to improve security.

Further, the payment device 100 further comprises a trigger switch configured for issuing a trigger signal when the top shell 11 and the bottom shell 12 are separated. The trigger switch may be provided at the connection between the top shell 11 and the bottom shell 12. For example, the trigger switch may be provided at the connecting screw connecting the top shell 11 and the bottom shell 12. Once the screw is loosened, the trigger switch is touched so that the trigger switch issues a trigger signal. The circuit board 21 is provided with a security chip 22, and the security chip 22 is provided with a storage module configured for storing key information to ensure the security of the payment transaction; the security chip 22 is further provided with a detecting module to detect whether the trigger switch issues a trigger signal. After the trigger signal is detected, the key information in the storage module is cleared, and the security chip 22 is locked at the same time. The payment device 100 using the sensitive element protection mechanism 10 will be thus locked so as to prevent the payment device 100 from performing payment operations, prevent user information from being stolen, and improve security.

The security chip 22 is provided at the circuit board 21, and the storage module is provided in the security chip 22 to store the key so as to ensure the security of the payment transaction; a trigger switch is provided so as to issue a trigger signal when the top shell 11 is separated from the bottom shell 12. A detecting module is provided in the security chip 22 to detect whether the trigger switch issues a trigger signal. When the trigger signal is detected, the key information in the storage module is cleared to prevent leakage of user information. The security chip 22 is locked at the same time to lock the payment device 100 using the sensitive element protection mechanism 10 so as not to continue to operate to improve security. Of course, in other embodiments, an external memory may also be provided to store the key or other information.

The payment device 100 uses the above-mentioned sensitive element protection mechanism 10 and may clear the key signal when the top shell 11 is separated from the bottom shell 12 to prevent leakage of user information. At the same time, the payment device 100 may be locked to prevent the payment device 100 from continuing to perform payment transactions, prevent credit card fraud, and improve security.

Further, a reset switch 23 is mounted at the circuit board 21, and a button 123 configured for pushing against the reset switch 23 is mounted at the bottom shell 12 to facilitate the reset operation.

Further, the trigger switch comprises a trigger gold finger 212 provided at the circuit board 21 and a contact post 24 connected to the trigger gold finger 212. When the bottom shell 12 is separated from the top shell 11, the contact post 24 will be separated from the trigger gold finger 212 on the circuit board 21 to issue a trigger signal. When the security chip 22 detects the trigger signal, key information in the storage module will be cleared, and the security chip 22 is locked at the same time.

Further, a mounting post configured for mounting the contact post 24 in a cooperating manner is provided in the bottom shell 12 so as to support the contact post 24. In this embodiment, there are two contact posts 24, which are located at both sides of the circuit board 21, respectively. Two corresponding trigger fingers 212 are correspondingly provided at both sides of the circuit board 21, respectively.

Further, the detecting module in the security chip 22 comprises an internal sensor configured for detecting the trigger signal issued by the trigger switch and an external sensor configured for detecting the trigger signal issued by the trigger switch. The external sensor and the internal sensor are used. When the external sensor or the internal sensor detects a trigger signal, a security mechanism will be started. That is to say, the key information in the storage module is cleared and the security chip 22 is locked.

Further, the security chip 22 is further provided with a temperature monitoring module configured for clearing key information in the storage module and locking the security chip 22 when the detection temperature exceeds a set value. The temperature monitoring module is provided to clear the key information in the storage module and lock the security chip 22 when the temperature of the payment device 100 exceeds a set security value so as to prevent the external high temperature from damaging the housing and thereby prevent the user information and the transaction data from being stolen.

Further, the security chip 22 is further provided with a power frequency monitoring module configured for clearing key information in the storage module and locking the security chip 22 when the detection frequency exceeds a set value. The power frequency monitoring module is provided to clear the key information in the storage module and lock the security chip 22 when the power frequency of the payment device 100 exceeds a set security value so as to prevent external electronic devices from directly cracking or destroying the security chip 22 and thereby prevent the user information and the transaction data from being stolen.

Further, the security chip 22 is further provided with a voltage monitoring module configured for clearing key information in the storage module and locking the security chip 22 when the detection voltage exceeds a set value. The voltage monitoring module is provided to clear the key information in the storage module and lock the security chip 22 when the working voltage of the payment device 100 exceeds a set security value so as to prevent external electronic devices from directly cracking or destroying the security chip 22 and thereby prevent the user information and the transaction data from being stolen.

Further, two metal meshes are provided in the security chip 22. Two metal meshes are provided in the security chip 22, which can better protect the security chip 22 and improve the security of the security chip 22.

Specifically, in this embodiment, the security chip 22 is a security CPU from Broadcom (CPU with a model number of BCM58303). In other embodiments, the security chip 22 may also be a security CPU from other companies.

Further, a near field payment area 111 and a code scanning payment area 112 are provided at the top shell 11, the payment device 100 further comprises a near field payment module 31 and a code scanning payment module 32, a circuit board 21 is electrically connected with the near field payment module 31 and the code scanning payment module 32 to control the operation of the near field payment module 31 and the code scanning payment module 32. The near field payment module 31 is located at a position corresponding to the near field payment area 111, and the code scanning payment module 32 is located at a position corresponding to the code scanning payment area 112, so that in a process of code scanning payment, the code scanning payment may be performed only by aligning a two-dimensional code on an electronic device such as a mobile phone or a tablet with the code scanning payment area 112 on the top shell 11; whereas in the process of near field payment, the near field payment may be performed only by bringing a near field payment device 100 close to the near field payment area 111.

By providing the near field payment area 111 and the code scanning payment area 112, mounting the near field payment module 31 and the code scanning payment module 32, providing the near field payment module 31 at a position corresponding to the near field payment area 111, and providing the code scanning payment module 32 at the code scanning payment area 112, the payment device 100 may perform both near field payment and code scanning payment; in transactions, merchants only need to prepare a device, which may reduce occupancy space and reduce the cost of purchasing devices. In addition, compared with the existing magnetic stripe card and IC card-based payment methods and payment devices 100, the payment device 100 may better protect near field payment cards and devices, protect code scanning payment devices, prevent cards from being worn, and prevent the risk that criminals copy magnetic stripe cards.

Specifically, near field payment comprises the following categories:

Card payment: Quick Pass, VISA (Visa), MasterCard and other NFC cards (NFC cards: Near Field Communication, supporting near field wireless communication cards).

Card token payment: China Unionpay Quick Pass, Apple pay, Huawei pay, Samsung Pay, and Xiaomi Pay.

Code scanning payment comprises: WeChat code scanning payment, Alipay code scanning payment, and Unionpay code scanning payment.

Further, the plane where the display screen 33 is located is in the same plane as the front surface of the near field payment area 111. This structure may facilitate the manufacture, and facilitate the near field payment operation while viewing the display screen 33.

Specifically, in the process of code scanning payment, there may be a cardholder scanning mode: a dynamic two-dimensional code may be displayed through the display screen 33 to facilitate scanning. Further, a two-dimensional code may be set to be updated once every one minute, so the security is better. In addition, the dynamic two-dimensional code may be acquired through networking with the background or generated by the whole machine, so as to ensure that the displayed two-dimensional code is safe. There may also be a cardholder scanned mode: the code scanning payment module 32 is used to actively scan a UnionPay two-dimensional code for payment. In the UnionPay two-dimensional code payment method, merchants may only obtain encrypted payment information, but cannot obtain other information about the bank card, which is safer. The amount of consumption is transmitted to the payment device 100 by an upper computer, such as an Electronic Cash Register (ECR), and the amount is displayed on the screen. The consumer only needs to place the payment code close to the device and the device performs scanning for payment. Moreover, the device is better in performance, and is relatively low in performance requirement of a mobile phone of consumers.

Further, a Bluetooth module (not shown in the figure) is further mounted at the circuit board 21 so as to integrate the Bluetooth function and thereby be further used as a BT Beacon to attract consumers to customers; at the same time, the display screen 33 may play a video advertisement, display a two-dimensional code of the merchant, and promote advertising coupons of merchants, etc.

Further, an included angle between a front surface of the code scanning payment area 112 and a horizontal plane is greater than an included angle between a front surface of the near field payment area 111 and a horizontal plane. The included angle between a front surface of the code scanning payment area 112 and a horizontal plane is set to be larger so that the code scanning payment area 112 tends to be in the vertical position more easily. Since users usually hold the upper or lower position of a handheld card or a smart phone when performing the near field payment, they are accustomed to placing the card or the smart phone slightly obliquely to the horizontal direction; in the process of code scanning, the two sides of a smart phone or a tablet are usually held by hand so as to expose the screen, and thus the smart phone will tend to be in the vertical position. Therefore, in this embodiment, the included angle between a front surface of the code scanning payment area 112 and a horizontal plane is set to be larger, which is convenient for users to perform code scanning payment and near field payment.

Further, the range of the included angle between the front surface of the code scanning payment area 112 and a horizontal plane is 40-50 degrees. The structure enables the inclination by which users scan the code and the desktop to form an angle of 40-50 degrees so as to facilitate the scanning code operation for cardholders of different heights. The reason why different angles are designed is as follows: better facilitating the use for people of different heights and providing a better man-machine operation experience. For example, the angle of 50 degrees is more suitable for short people, and the inclination of 40 degrees is more suitable for tall people. The range of the included angle between the front surface of the code scanning payment area 112 and a horizontal plane is set to be 40-50 degrees so as to be suitable for most users.

Further, the near field payment area 111 and the code scanning payment area 112 are arranged longitudinally. Specifically, in the front-to-back longitudinal arrangement, the near field payment area 111 and the code scanning payment area 112 may be sequentially arranged. Of course, the payment code area 112 and the near field payment area 111 may be sequentially provided. In other embodiments, the near field payment area 111 and the code scanning payment area 112 are arranged side by side horizontally. Specifically, in the left-to-right horizontal arrangement, the near field payment area 111 and the code scanning payment area 112 may be sequentially arranged. Of course, the payment code area 112 and the near field payment area 111 may be sequentially arranged.

In this embodiment, since the payment device 100 further comprises a display screen 33, the display screen 33, the near field payment area 111, and the code scanning payment area 112 are arranged longitudinally. For example, in this embodiment, in the front-to-back longitudinal arrangement, a code scanning payment area 112, a display screen 33 and a near field payment area 111 may be sequentially arranged. In other embodiments, in the front-to-back longitudinal arrangement, the near field payment area 111, the display screen 33 and the code scanning payment area 112 may also be sequentially arranged. There may also be sequentially: a display screen 33, a code scanning payment area 112 and a near field payment area 111; a display screen 33, a near field payment area 111, and a code scanning payment area 112; a code scanning payment area 112, a near field payment area 111 and a display screen 33; a near field payment area 111, a code scanning payment area 112 and a display screen 33. Of course, in some embodiments, the display screen 33, the near field payment area 111, and the code scanning payment area 112 may also be arranged horizontally. For example, in the left-to-right horizontal arrangement, the code scanning payment area 112, the display screen 33 and the near field payment area 111 may be sequentially arranged. In other embodiments, in the left-to-right horizontal arrangement, the near field payment area 111, the display screen 33 and the code scanning payment area 112 may also be sequentially arranged. There may also be sequentially: a display screen 33, a code scanning payment area 112 and a near field payment area 111; a display screen 33, a near field payment area 111 and a code scanning payment area 112; a code scanning payment area 112, a near field payment area 111 and a display screen 33; and a near field payment area 111, a code scanning payment area 112, and a display screen 33.

Further, a connection interface configured for connecting an external server is provided at the bottom shell 12, and the connection interface is electrically connected with the circuit board 21. A connection interface is provided at the bottom shell 12 for facilitating the connection with an external server. For example, when the connection interface is a network interface, it may be directly networked with an external server; when the connection interface is a data interface, it may realize direct data connection with an external server. In still other embodiments, a wireless module such as a WiFi may be mounted at the circuit board 21 so as to be connected with an external server through a wireless connection.

Figure 1:
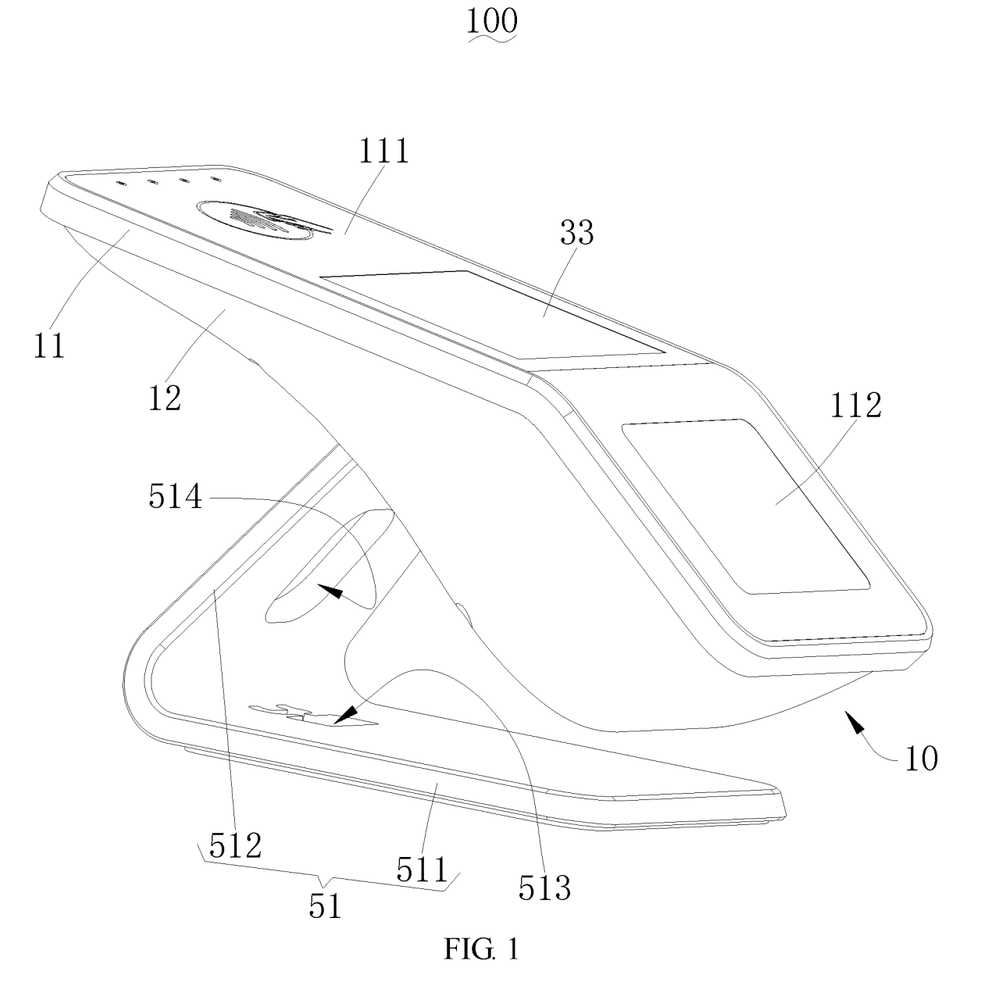
FIG. 1 is a perspective structural schematic view of a payment device provided by one embodiment of the present application.
Figure 2:
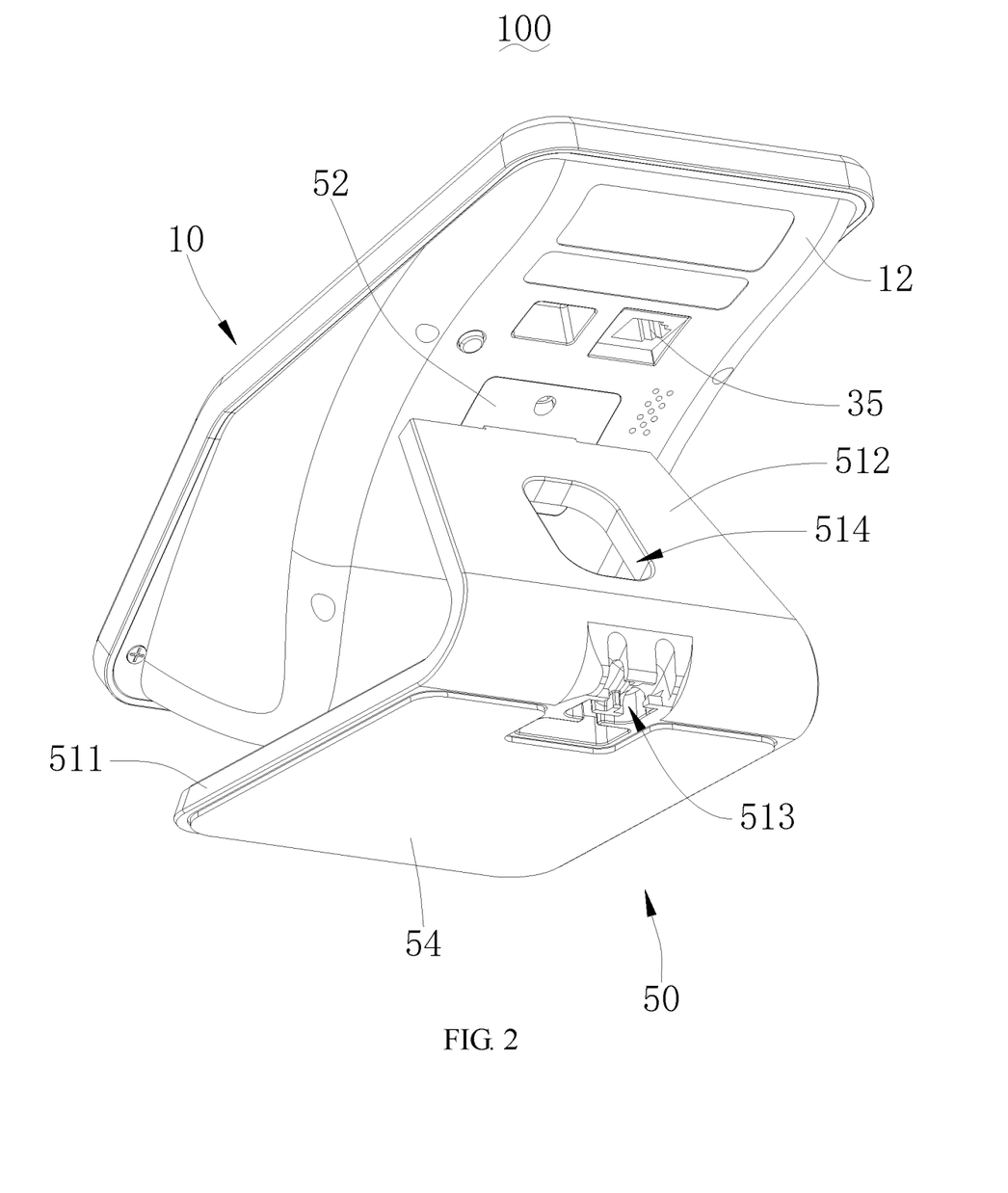
FIG. 2 is a perspective structural schematic view of the payment device in FIG. 1 viewed from another angle.
Figure 3:
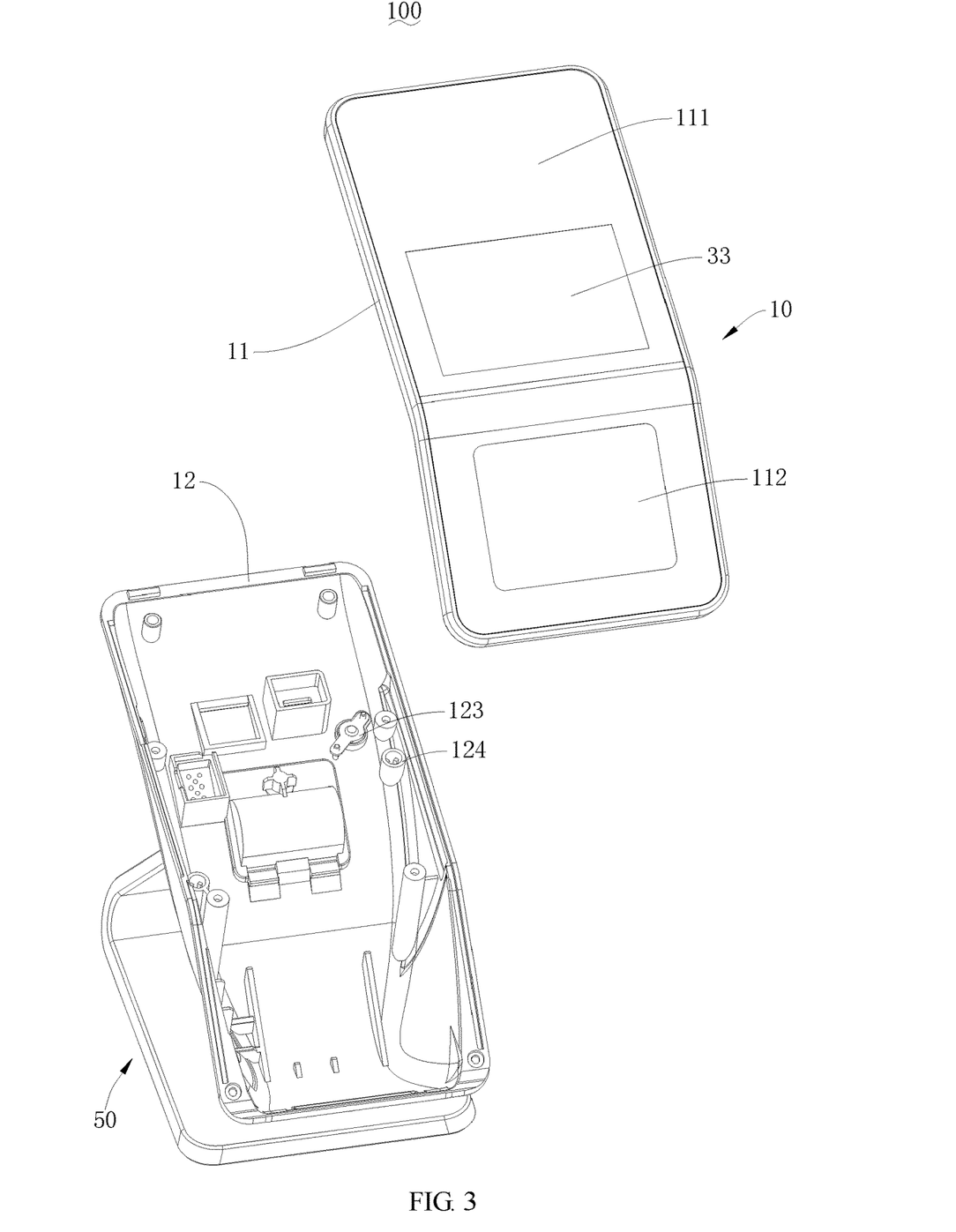
FIG. 3 is an exploded structural schematic view of the payment device in FIG. 1.
Figure 4:
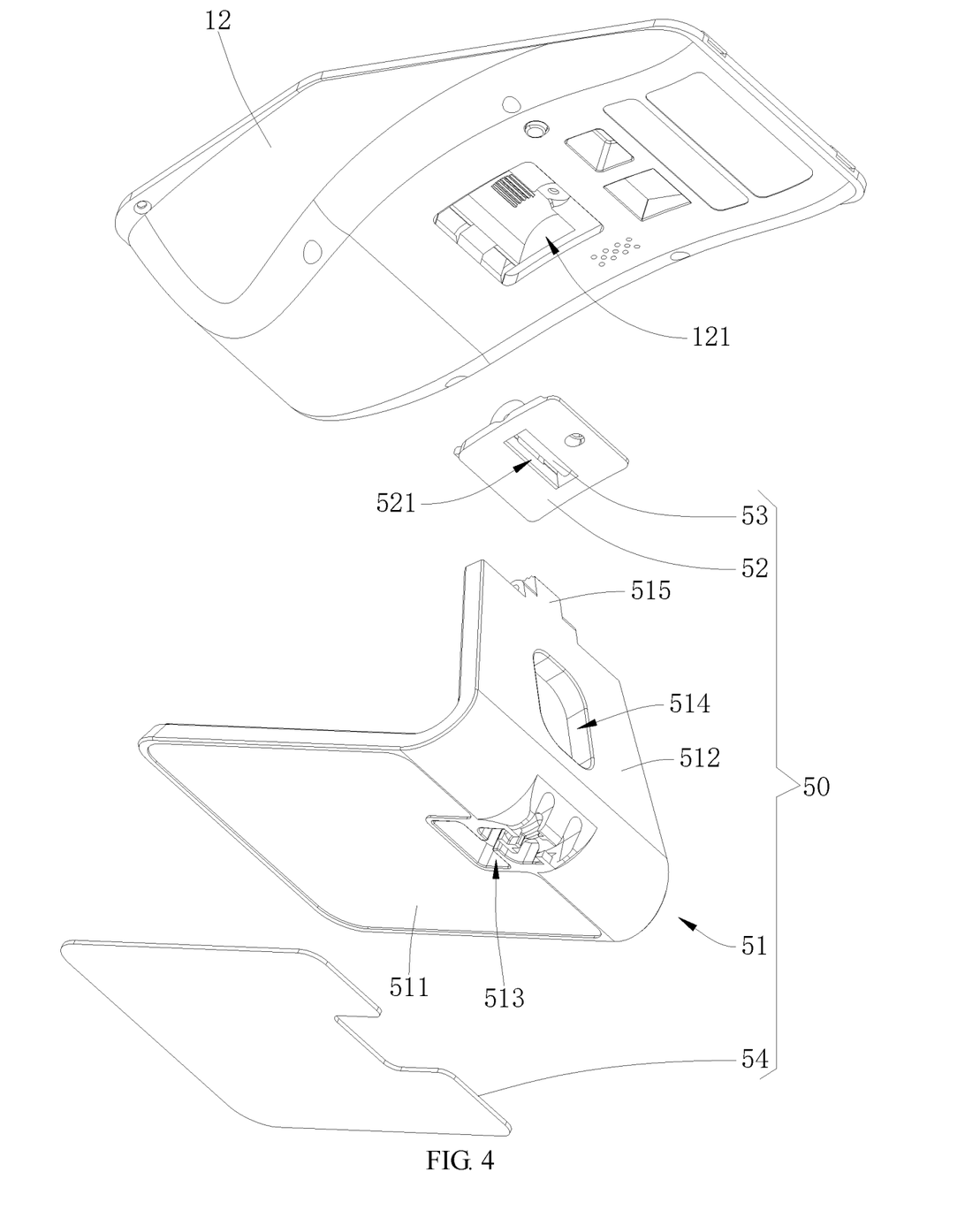
FIG. 4 is an exploded structural schematic view of a bottom shell and a base in FIG. 3.
Figure 5:
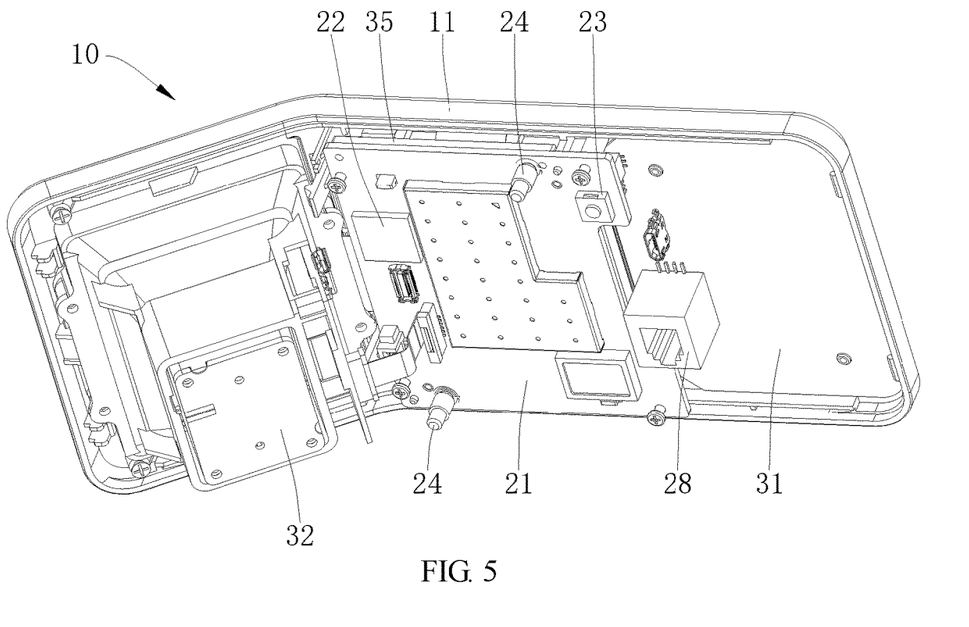
FIG. 5 is a structural schematic view of a sensitive element protection mechanism in FIG. 3.
Figure 6:
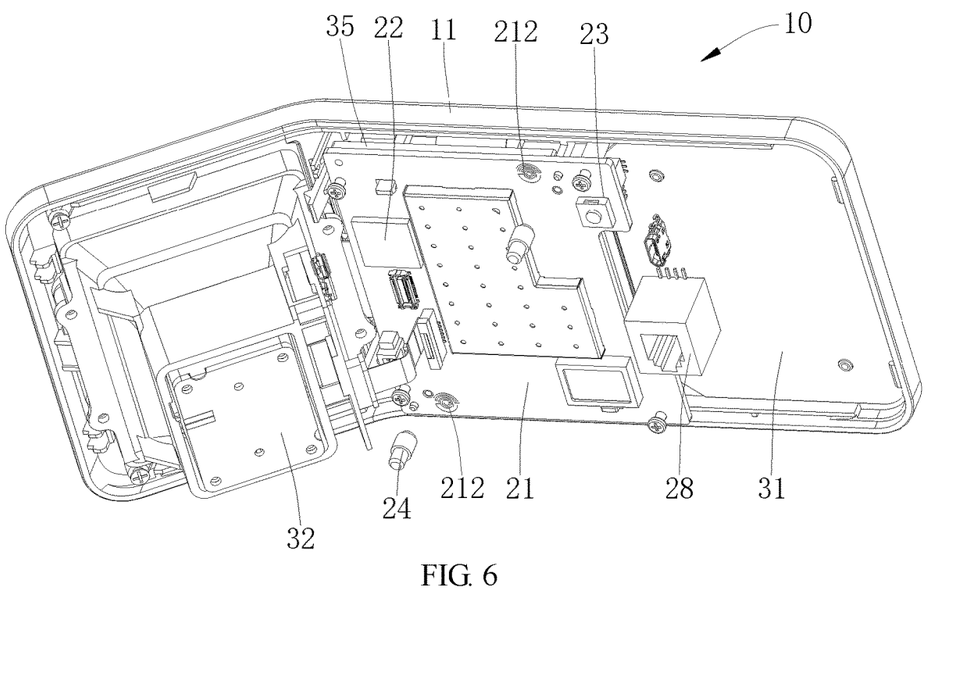
FIG. 6 is a structural schematic view of the sensitive element protection mechanism in FIG. 5, with the connecting post and the circuit board being separated.
Figure 7:
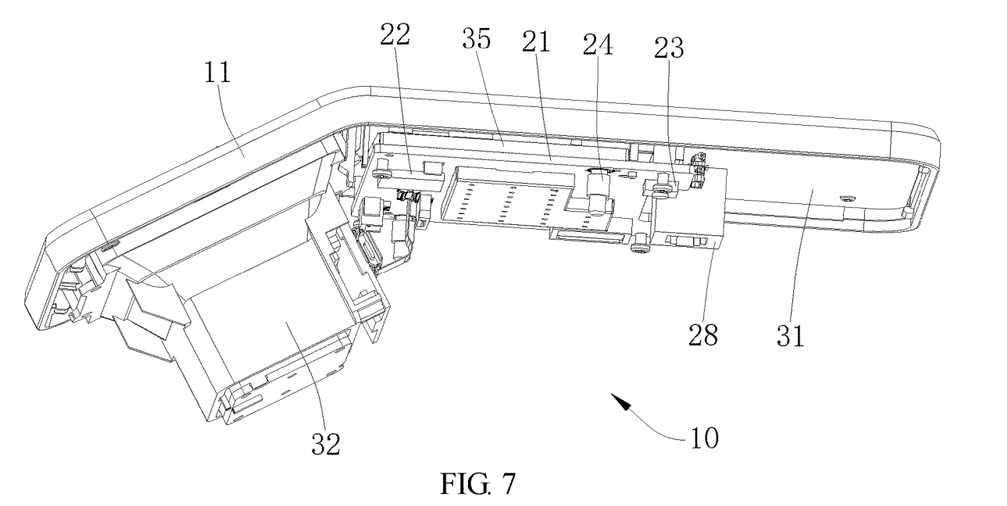
FIG. 7 is a perspective structural schematic view of the sensitive element protection mechanism in FIG. 5 viewed from another angle.
Figure 8:
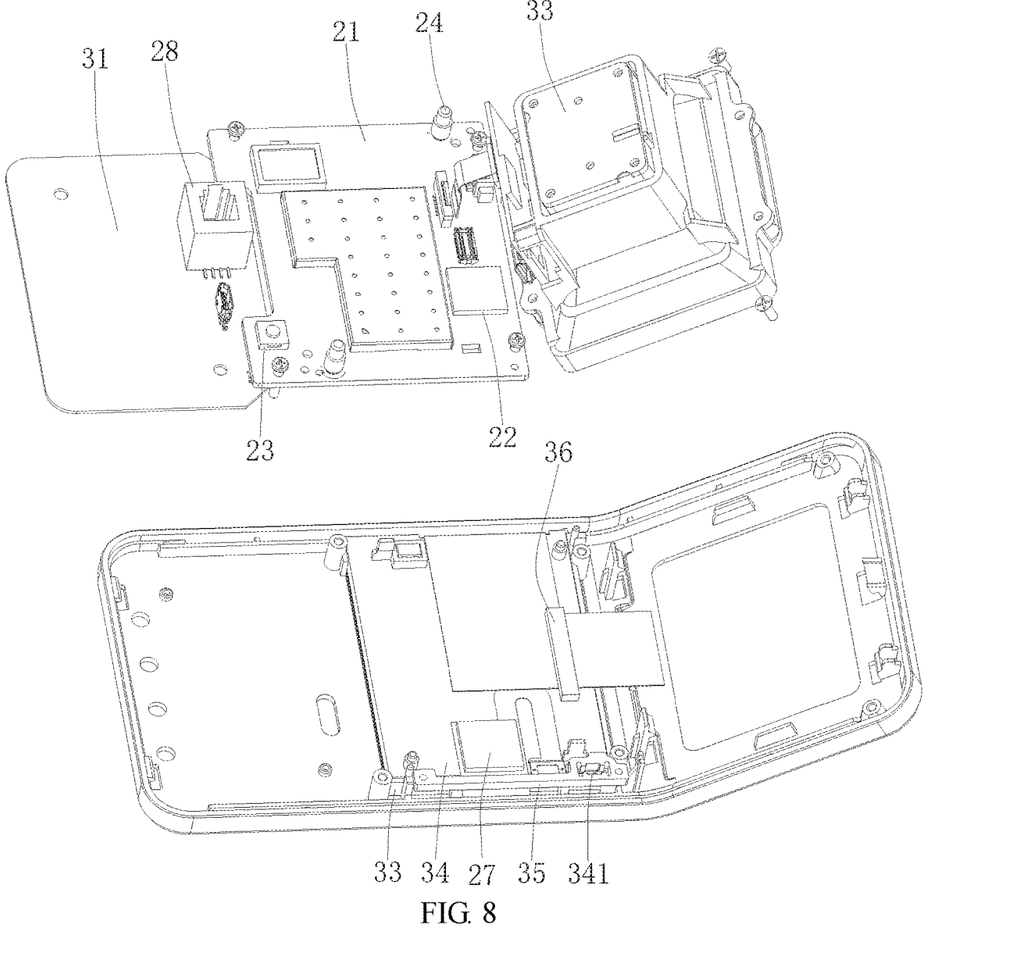
FIG. 8 is an exploded structural schematic view of a sensitive element protection mechanism in FIG. 5.

Referring to FIGS. 2, 3 and 4, further, the payment device 100 further comprises a base 50, the base 50 is pivotally connected to the bottom shell 12 so as to support the payment device 100 through the base 50 and facilitate the adjustment of an angle between the top shell 11 and a horizontal direction at the same time.

Further, the base 50 comprises a support 51, the support 51 comprises a base plate 511 and a support plate 512 provided obliquely to the base plate 511, a lower end of the support plate 512 is connected to the base plate 511, and an upper end of the support plate 512 is connected to the bottom shell 12. The support plate 512 is connected with the base plate 511 to form the support 51, which has the advantages of a simple structure, a convenient processing, a low cost, and a light weight, and is connected with the bottom shell 12 at the same time so as to stably support the payment device 100.

Specifically, the base plate 511 and the support plate 512 may be integrally formed to ensure the connection strength between the base plate 511 and the support plate 512. In other embodiments, the support plate 512 may also be fixed on the base plate 511.

Further, the base 50 further comprises a gasket 54 fitted to the bottom surface of the base plate 511. The gasket 54 is provided to increase the friction between the base plate 511 and the media surface such as the desktop so that the base 50 may be more stably supported on the desktop. Meanwhile, the abrasion of the base plate 511 can be reduced.

Further, the support plate 512 is connected to one end of the base plate 511, a clamping hole 513 configured for clamping a conducting wire is provided in the middle of the connection between the support plate 512 and the base plate 511, and the middle of the support plate 512 is provided with an opening through which the conducting wire passes. A clamping hole 513 is defined in the support 51, and an opening 514 is defined in the middle of the support plate 512, so that the conducting wire is fixed through the clamping hole 513 so as to fix the conducting wire through which the payment device 100 is connected with an external server or charged. An opening 514 is defined in the support plate 512 so that the conducting wire may be better arranged so as to ensure the cleanness of the tabletop.

Further, the base 50 further comprises a connecting block 53, a receiving groove for receiving the connecting block 53 in a cooperating manner is defined at the bottom shell 12, a convex plate 515 is provided at the top of the support plate 512, a socket 521 into which the convex plate 515 is inserted is defined at the bottom of the connecting block 53, and a connecting shaft 53 which passes through the convex plate 515 and is fixed in the socket 521 is mounted at the connecting block 53. By using the connecting block 53 and connecting the convex plate 515 on the support plate 512 with the connecting block 53 through the connecting shaft 53, the angle between the connecting block 53 and the support plate 512 may be slightly adjusted so as to adjust the horizontal angle of the top shell 11. A receiving groove 521 is provided at the bottom shell 12 so as to facilitate the mounting of the connecting block 53. The connecting block 53 is provided, which also facilitates the connection between the bottom shell 12 and the support plate 512. In other embodiments, the support plate 512 may also be directly connected with the bottom shell 12.

The above description is only a preferred embodiment of the present application, and not intended to limit the present application. Any modification, equivalent replacement and improvement made within the spirit and principle of the present application should be included within the scope of protection of the present application.

What is claimed is:

1. A sensitive element protection mechanism, comprising a circuit board and a sensitive element configured to store, transmit and/or process user account information and user transaction information, wherein the sensitive element protection mechanism further comprises a shield arranged in parallel with the circuit board, and an elastic member connecting the circuit board and the shield to prevent the circuit board from being separated from the shield; and the sensitive element is located on a side of the circuit board nearer to the shield; wherein the distance between the circuit board and the shield is in a range from 2.5 mm to 3.5 mm.

2. The sensitive element protection mechanism according to claim 1, wherein the circuit board or the shield is provided with a groove configured to position the elastic member.

3. The sensitive element protection mechanism according to claim 1, wherein the elastic member is provided at the periphery of the circuit board, or at both sides of the circuit board, or in the middle of the circuit board.

4. The sensitive element protection mechanism according to claim 1, wherein a protection device configured to shield the sensitive element is provided at the circuit board and around the sensitive element, and the height of each protection device is greater than the thickness of the sensing element.

5. The sensitive element protection mechanism according to claim 1, wherein a PCB wall configured to shield the sensitive element is further provided at the circuit board.

6. The sensitive element protection mechanism according to claim 5, wherein a zebra strip connecting the circuit board with the shield is provided in the PCB wall.

7. The sensing element protection mechanism according to claim 1, wherein a display screen is further mounted at the shield, an FPC is provided at the display screen, and the FPC is connected to the circuit board.

8. The sensing element protection mechanism according to claim 7, wherein the length of the FPC is equal to the length of the connection from the display screen to the circuit board, and the ratio of the width of the FPC to the length of the side of the display screen where the FPC is located is in a range from ½ to 1.

9. A payment device, comprising a top shell and a bottom shell, wherein the payment device further comprises the sensitive element protection mechanism according to claim 1, and the shield of the sensitive element protection mechanism is the top shell.

* * * * *